United States Patent [19]

Brambilla et al.

[11] 3,981,960

[45] Sept. 21, 1976

[54] REPROCESSING METHOD OF CARAMIC NUCLEAR FUELS IN LOW-MELTING NITRATE MOLTEN SALTS

[75] Inventors: Giovanni Brambilla, Stagno; Giacomo Caporali; Mario Zambianchi, both of Pisa, all of Italy

[73] Assignee: AGIP Nucleare S.p.A., Rome, Italy

[22] Filed: Apr. 24, 1973

[21] Appl. No.: 353,955

[30] Foreign Application Priority Data
Apr. 27, 1972 Italy................................. 23583/72
Apr. 27, 1972 Italy................................. 23584/72

[52] U.S. Cl.............................. 423/5; 252/301.1 R
[51] Int. Cl.²........................................ C01G 56/00
[58] Field of Search................. 423/5; 252/301.1 R, 252/301.1 W

[56] References Cited
UNITED STATES PATENTS 3,322,509   5/1967   Vogg........................................ 423/5

3,708,267   1/1973   Avogadro et al. ..................... 423/5

FOREIGN PATENTS OR APPLICATIONS
1,037,952   8/1966   United Kingdom..................... 423/5

*Primary Examiner*—Benjamin R. Padgett
*Assistant Examiner*—R. E. Schafer
*Attorney, Agent, or Firm*—Ralph M. Watson

[57] ABSTRACT

Ceramic nuclear fuel is reprocessed through a method wherein the fuel is dispersed in a molten eutectic mixture of at least two alkali metal nitrates and heated to a temperature in the range between 200°C and 300°C. That heated mixture is then subjected to the action of a gaseous stream containing nitric acid vapors, preferably in the presence of a catalyst such as sodium fluoride. Dissolved fuel can then be precipitated out of solution in crystalline form by cooling the solution to a temperature only slightly above the melting point of the bath.

11 Claims, No Drawings

REPROCESSING METHOD OF CARAMIC NUCLEAR FUELS IN LOW-MELTING NITRATE MOLTEN SALTS

It is known that, during the operation of the nuclear reactors, it is necessary periodically to replace the fuel in order to obviate the mechanical damage caused by the radiation, the accumulation of the fission products forming neutronic poisons, and the decrease of reactivity due to the progressive consumption of fissile material.

The fuel coming from the reactor is subjected to a series of operations which take the name of "reprocessing" consisting in the separation of the fissile and fertile elements (uranium, plutonium, thorium) and in their purification from the fission products.

The reprocessing methods that have been applied on a large scale are based on the liquid-liquid extraction of aqueous solutions of the fuel with solutions of suitable organic solvents.

The reprocessing of the fuels discharged from the future fast reactors, which are expected to be able to operate in the next ten years, gives rise nevertheless to new problems, entirely different from the ones up to now known for the present generation of nuclear reactors.

Said fuels will be formed by uranium, plutonium and thorium oxides or carbides, with stainless steel or zircaloy jacket and sodium cooling.

The difficulties which will be met in the reprocessing of said elements will be due mainly to the high burn-up and specific powers to which they will be subjected, with subsequent increase of the radiation intensity and concentration in fission products in to the thermal reactors, noticeable heat development, the presence of fission gas under pressure and of sodium.

The more important consequences will be the radiolitic degradation of the organic solvents, the formation of noticeable volumes of strongly radioactive effluents to be discharged, the possibility of criticality phenomena due to the aqueous solutions.

Therefore, there is noticeable interest in the study of reprocessing methods named "the pyrochemical ones" because they make use, at higher temperatures, of non aqueous solvents like the molten salts.

By means of processes of this kind the abovementioned drawbacks would be avoided and moreover it would be possible to operate with a very short cycle, with short cooling times, with noticeable reduction of the investment and operation costs.

The first problem which arises in the reprocessing of the irradiated fuels is that of their dissolution which is generally effected in two phases, the first one consisting in the removal of the jacket, by mechanical or chemical means, and the second one in the solubilization of the core of the element, formed by uranium, plutonium and thorium oxides or carbides.

This operation is effected in the aqueous processes with mixtures of concentrated acids: in such a way it is, however impossible to eliminate the large amounts of volatile fission products (Krypton, Xenon, Radium, Tritium) which accumulate in the effluents from which they may be withdrawn only with difficulty.

The present invention relates to a method of dissolution of ceramic fuels in a molten mixture of low-melting salts, like alkaline nitrates, by means of the vapours of nitric acid.

It is known that there is the possibility of dissolving the uranium and plutonium oxides in mixtures of molten alkali metal chlorides, for example in the eutectic KCl-LiCl, by means of mixtures $Cl_2/HCl$, but said method, used in the electrolytic reprocessing process named "Salt cycle" carried out in the Hanford Laboratories (USA), implies high temperatures reactions (700°–800°), with hygroscopic salts and highly corrosive gases.

Moreover it is known that there is the possibility of dissolving the uranium oxide in melted ammonium nitrate at temperatures of about 210°–240°C, but said method used by Japanese researchers for the reprocessing of the irradiated uranium, by means of subsequent decomposition of the uranyl nitrate which has been formed in an insoluble compound of uranium at the temperature of 350°, seems not easy to be used in practice, because of the dangers of explosion catalyzed by fission products, presented by the ammonium nitrate.

Finally there is known the use of molten alkali metal nitrates in admixture with hydroxides and peroxides in the oxidizing disintegration of the irradiated fuels, but said method gives rise to the formation of insoluble compounds (uranates and plutonates) in the reaction means.

The use of molten alkali-metal nitrates as solvent means is particularly interesting for the following reasons:

they have low melting points
they are not very hydroscopic, so that particular precautions in their manipulation are not necessary
they are not so corrosive as the commonly used materials.

The compositions and melting points of eutectic mixtures of alkali metal nitrates which may be used with advantage are the following ones:

| | | |
|---|---|---|
| $LiNO_3$—$NaNO_3$—$KNO_3$ | 30–17–53 moles % | 120°C |
| $LiNO_3$—$KNO_3$ | 41–59 | 133.5 |
| $LiNO_3$—$NaNO_3$ | 54–46 | 193 |
| $KNO_3$—$NaNO_3$ | 50–50 | 220 |

Now it has been found that it is possible to dissolve without the above-mentioned drawbacks the ceramic nuclear fuels in said mixtures of molten alkali metal nitrates by subjecting them, at the temperature of 200°–300°C, to the action of vapours of nitric acid, optionally in the presence of a catalyst such as, for example, halide ions, particularly fluorides. The nitric acid vapours may be produced as follows:

1. By reaction between $NaNO_3$ and concentrated $H_2SO_4$
2. By reaction between 65 % $HNO_3$ and concentrated $H_2SO_4$
3. By heating fuming $HNO_3$.

According to a preferred variant of the present invention, the uranium oxide is oxidized before the dissolution, to $U_3O_8$.

This operation, which may be easily effected at the temperature of 450°–500°C, in a stream of air or oxygen, accelerates, the dissolution phase, by reducing the size of the solid particles and giving a compound ($U_3O_8$), more easily soluble than $UO_2$.

Finally, as far as the plutonium oxide is concerned, the process of the invention is applied to it, as such, as well as the variants described for the uranium.

Obviously also mixtures of oxides may be subjected to the process of the invention.

The nuclear fuel formed by oxides of uranium, plutonium and thorium, solubilized according to the process of the present invention, may then be differently treated to separate the fission products and, in case it is necessary, the same components from each other.

The possible methods are the following ones:

thermal decomposition at temperature (350°C) higher than the one of the nitrates solution in insoluble compounds.

chromatography in molten salts on inorganic exchangers (glass powder, γ-alumina).

fractional precipitation with molten salts containing alkali dissolved with basic oxides or with gas ($NH_3$).

fractional crystallization.

In the present application, by ceramic fuels we means the oxides, the carbides, the nitrates and other compounds, used alone or in admixture, for this purpose in the known technique.

As a matter of fact it has now been found that it is possible, by cooling the so obtained supersaturated solution to obtain the separation in crystalline form, of the dissolved element or elements.

Generally the cooling occurs by lowering the reaction temperature (250°C) to one a little higher than the melting point of the bath, for example 150°C.

The method according to the invention makes it possible, therefore, to decontaminate the irradiated nuclear fuel, from the fission products formed during the residence of the fuel in the reactor, and also to separate the main components uranium, thorium and plutonium.

The more important elements produced by the fission and present in the fuel in variable percentages are:

volatile elements
alkali and alkali-earth metals
rare earths
noble metals and refractory metals.

By operating with the process of the invention, the volatile elements develop from the bath in the dissolution phase with nitric acid vapours, whereas the noble and refractory metals are not soluble or very little soluble and are separated for the greater part with a filtration at the dissolution temperature.

The further precipitation of the element or of the elements to be purified, which represent the major part of the solute, in crystalline form, is achieved through the process of the present invention by means of the lowering of the temperature, whereas the soluble fission products, mainly the alkali metals, the alkali-earth metals and the rare earths, present in smaller amount, remain in solution in the molten salts, so long as the solution is unsaturated as to them.

The solubilities of U Th Pu . . . in the eutectic $KNO_3$ - $LiNO_3$ are respectively at 150°C:

for the uranium $8.10^{-3}$ gr./gr. salt
for the thorium $4.10^{-3}$ gr./gr. salt
for the plutonium $2.10^{-4}$ gr./gr. salt.

By filtration of the formed crystalline mass and washing of the same with other fresh solution, the desired element or elements are collected in a water-soluble form, and may be therefore recovered with "dry" or "moist" process, according to the desired final product.

By repeating the crystallization operation consisting in adding fresh solvent, dissolution by heating at 250°C, cooling at 150°C, filtration, it is also possible to increase the degree of purity of the final product itself.

By way of unrestrictive example, the following examples are reported.

EXAMPLE 1

10 gr. of $U_3O_8$ coming from a sintered tablet of $UO_2$, broken up by oxidation at 450°C in an air stream during 3 hours, were dispersed in 100 gr. of an eutectic mixture of molten salts $KNO_3$ - $LiNO_3$ (67 − 33 %) by weight, melting point 133.5°C), prepared by melting the pure reagents in suitable proportions at 350°C.

The reaction has been effected in a 100 or 150 cc quartz glass, placed in an electric oven having a thermoregulated well, and the temperature was kept at 250°C.

In the same bath a stream of argon gas has been let to bubble this stream carrying $HNO_3$ vapours, produced by reaction between $NaNO_3$ and $H_2SO_4$ in molar proportions 1 : 1, in a 250 cc glass flask, kept by a water-bath at the constant temperature of 85°C.

After 3 hours and with an argon stream of 20 l/hr conveying 3 gr./hr of $HNO_3$, the uranium oxide was entirely dissolved with the formation of a quite clear yellow solution.

The density of the nitrates at 160°C being equal to 1.942 gr./cc. said solution resulted in a concentration in $UO_2$ equal to 180 gr./l.

In another test were dissolved 15 gr. of $U_3O_8$ in 85 gr. of the same molten nitrates at 250°C; after 3.5 hr of reaction and with a consumption of 12 gr. of $HNO_3$, there was obtained a solution at about 300 gr./l of $UO_2$.

EXAMPLE 2

10 gr. of the same $U_3O_8$, as in example 1, were dispersed by stirring, in 100 gr. of an eutectic mixture of molten salts $KNO_3$ - $LiNO_3$, at the temperature of 250°C.

A stream of argon has been let to bubble at the speed of 15 l/hr in a Drexler bottle, kept dipped in a water-bath at 50°C, and containing 300 gr. of fuming $HNO_3$ ($d$ = 1.52 gr./cc — boiling point = 83°C), and successively in the molten bath. After 5 hr and with a consumption of 17.5 gr. of $HNO_3$, equal to 3.5 gr./hr, a complete dissolution of the uranium oxide was obtained.

EXAMPLE 3

10 gr. of $UO_2$ powder were placed in 100 gr. of a binary eutectic mixture of $KLiNO_3$, in a pyrex glass reactor having a conical bottom, kept at 250°C, with tight cover, and a central pipe plunging in the inlet bottom of the nitric acid vapours and side outlet connected through a cooler for the condensation of the excess vapours, with a litle suction pump.

A needle valve allowed the inlet of a small air flow into the Drexler bottle containing fuming $HNO_3$ in such a way as to prevent windages phenomena.

By keeping $HNO_3$ at 85°C and a pressure difference with respect to the environment of 160 mm Hg, with a total inlet of 5 l. of air and a consumption of 16,7 gr. of $HNO_3$, 9.1 of which collected in the condenser, the dissolution of $UO_2$ in only 15 minutes or reaction was obtained.

EXAMPLE 4

5 gr. of Carlo Erba RP $ThO_2$ and 200 mg of NaF were dispersed in 100 gr. of a mixture of molten nitrates $KNO_3$ - $LiNO_3$ at the temperature of 250°C.

In the bath kept under stirring was let to bubble an argon stream conveying $HNO_3$ vapours, as described in example 1.

With an argon flux of 20 l/hr conveying 3,5 gr./hr of $HNO_3$, a complete dissolution of the thorium oxide is obtained after 5 hr, with formation of a quite clear uncolored solution.

In another test the dissolution occurred also with lesser amount of catalyst (20 mg of NaF/gr of $ThO_2$) but more slowly.

What we claim is:

1. The method of reprocessing ceramic nuclear fuel, wherein said fuel is mixed with a molten, eutectic mixture of at least two alkali metal nitrates, heated to a temperature in the range between 200°C and 300°C, and then subjecting said molten nuclear fuel-containing mixture to the action of a gaseous stream containing nitric acid vapours.

2. The method of reprocessing ceramic nuclear fuel as claimed in claim 1, wherein said heated mixture is subjected to the action of a gaseous stream containing nitric acid fumes in the presence of a catalyst.

3. The method of reprocessing ceramic nuclear fuel as claimed in claim 2, wherein the catalyst is a fluoride.

4. The method of reprocessing ceramic nuclear fuel as claimed in claim 1, wherein the ceramic nuclear fuel is an uranium compound.

5. The method of reprocessing ceramic nuclear fuel as claimed in claim 4 wherein the uranium compound is previously subjected to an oxidizing treatment.

6. The method of reprocessing ceramic nuclear fuel as claimed in claim 1, wherein the ceramic nuclear fuel is a plutonium compound.

7. The method of reprocessing ceramic nuclear fuel as claimed in claim 1, wherein the ceramic nuclear fuel is a thorium compound.

8. The method of reprocessing ceramic nuclear fuel as claimed in claim 1, wherein the ceramic nuclear fuel is a mixture of oxides of U,Th and Pu.

9. The method of reprocessing ceramic nuclear fuel as claimed in claim 1, wherein said fuel is dissolved in said mixture of molten salts, and the so obtained solution is cooled thereby recovering from it, in a crystalline form, the dissolved fuel.

10. The method of reprocessing ceramic nuclear fuel as claimed in claim 9, wherein the cooling takes place starting from the reaction temperature to a second temperature slightly higher than the melting point of said solution.

11. The method of reprocessing ceramic nuclear fuel as claimed in claim 10, wherein said second temperature is about 150°C.

* * * * *

UNITED STATES PATENT AND TRADEMARK OFFICE
CERTIFICATE OF CORRECTION

PATENT NO. : 3,981,960
DATED : September 21, 1976
INVENTOR(S) : Giovanni Brambilla, et al It is certified that error appears in the above-identified patent and that said Letters Patent are hereby corrected as shown below:

Col. 1, line 34, delete "to"

Col. 4, line 59, correct spelling of "little"

Signed and Sealed this twelfth Day of July 1977

[SEAL]

Attest:

RUTH C. MASON
*Attesting Officer*

C. MARSHALL DANN
*Commissioner of Patents and Trademarks*